March 29, 1966 J. C. TORBETT, JR 3,243,513

TELEPHONE PAY STATION

Filed April 15, 1963 5 Sheets-Sheet 1

INVENTOR.
JOHN C. TORBETT, JR.
BY Ralph R. Kalish
ATTORNEY

March 29, 1966 J. C. TORBETT, JR 3,243,513

TELEPHONE PAY STATION

Filed April 15, 1963 5 Sheets-Sheet 2

INVENTOR.
JOHN C. TORBETT, JR.
BY Ralph W. Kalish
ATTORNEY

INVENTOR.
JOHN C. TORBETT, JR.
BY Ralph W. Kalish
ATTORNEY

INVENTOR.
JOHN C. TORBETT, JR.
BY Ralph R. Kalish

ATTORNEY

INVENTOR.
JOHN C. TORBETT, JR.
BY Ralph W. Kalish
ATTORNEY

United States Patent Office 3,243,513
Patented Mar. 29, 1966

3,243,513
TELEPHONE PAY STATION

John C. Torbett, Jr., Wright City, Mo., assignor to M-T Installation and Repair Co., Inc., Wright, Mo., a corporation of Missouri Filed Apr. 15, 1963, Ser. No. 273,072
9 Claims. (Cl. 179—6.5)

Figure 1:
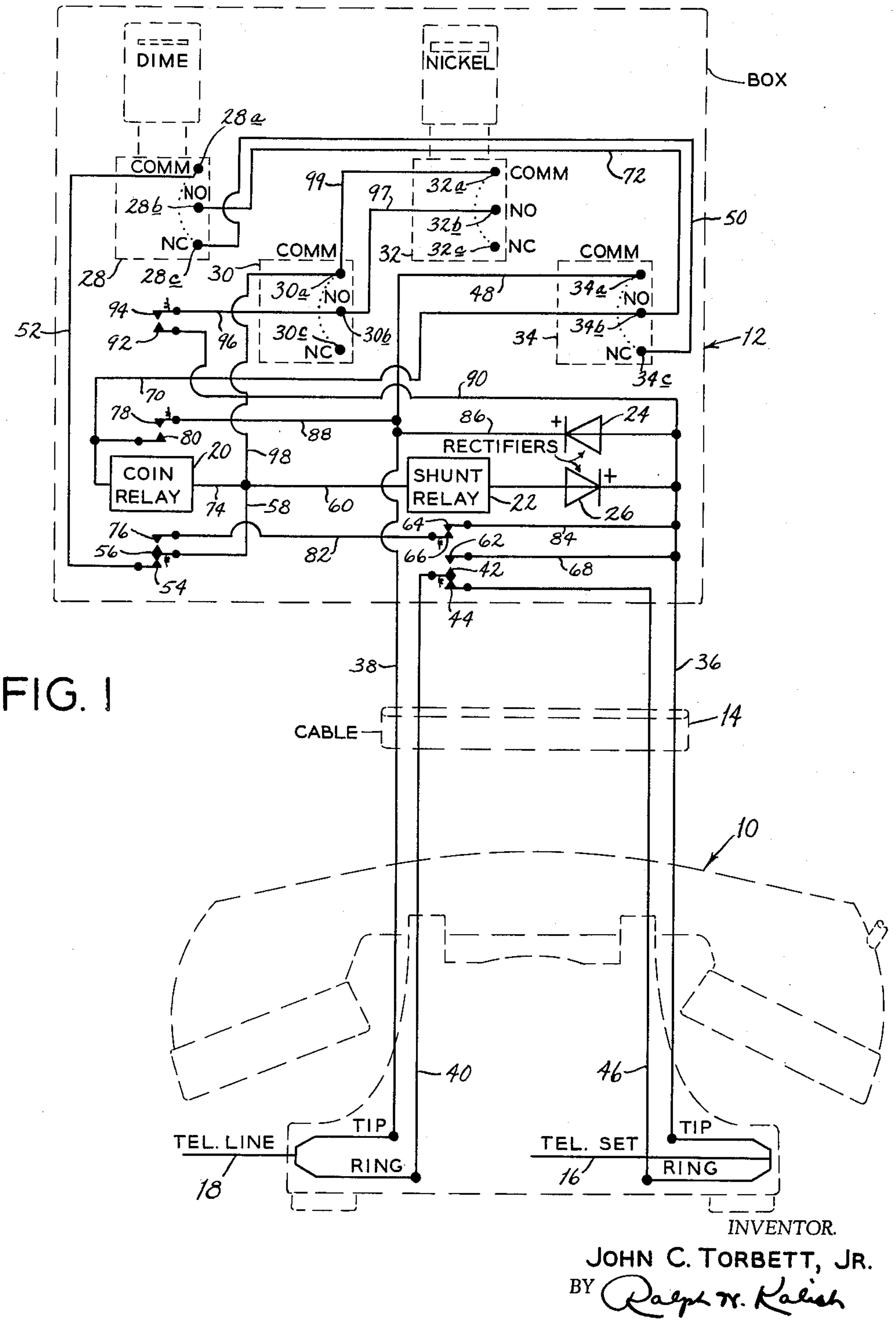
Figure 2:
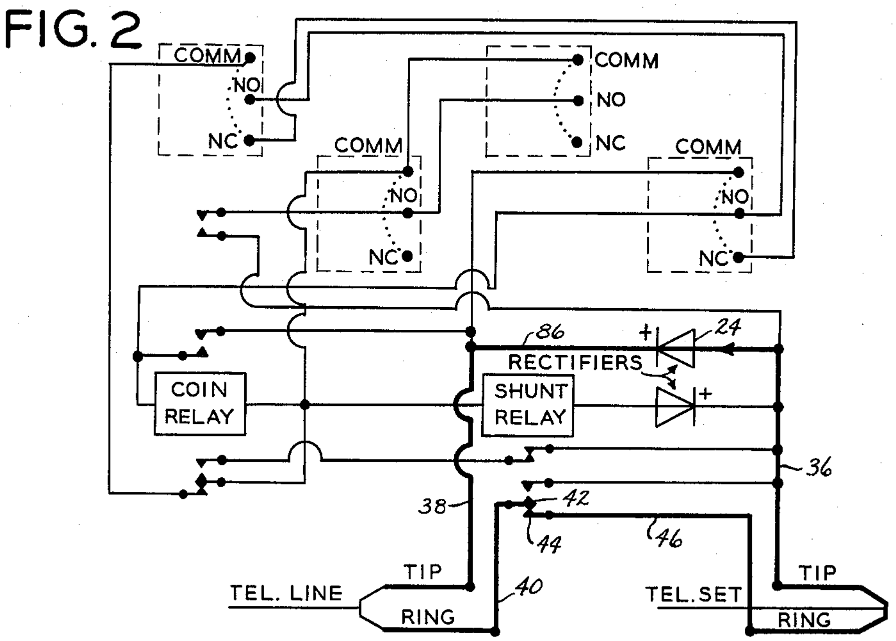

The present invention relates generally to pay stations or collection devices for telephones and the like and more particularly to a pay station that can be used with existing telephones, especially those not otherwise equipped with toll collecting means and with other devices where the collection of a toll is required.

There are in existence many different types of pay stations and collection devices, many of which are used specifically for collecting telephone tolls and other service charges. All of the known devices are physically attached to or made part of the phone or other device and rely upon mechanical as well as electrical cooperation therebetween. So far as is known, however, no existing toll collection device has heretofore been constructed which can be installed separately from the phone itself and used with phones such as home and office phones, as well as with other devices, and which is completely independent in operation from mechanical cooperation therewith. Furthermore, no known telephone toll collection device has been devised which establishes communication between two phones independently of an operator and before the charge for the call is deposited. Still further, no toll collection device has heretofore been devised which is mechanically and structurally independent of the telephone itself and which is also versatile enough to be used to collect tolls for local as well as for long distance calls.

Briefly, the subject device comprises an instrument for use in conjunction with any conventional telephone including a home phone, a desk phone, a wall phone, or a pay phone, to collect local as well as long distance tolls, said instrument comprising a coin receiving structure and a control circuit adapted to be connected to the circuit of a telephone a similar device, said control circuit including means enabling the telephone circuit to contact another phone, and which provides means for temporarily preventing communication with the contacted phone until after a toll is collected, and means responsive to the receipt of the required toll for establishing communication between the phones.

It is a principal object of the present invention to provide a toll collecting means which can be installed and used with existing telephone equipment.

Another object is to provide toll collecting means which are structurally separate from and mechanically independent of the equipment for which it is to collect tolls.

Another object is to provide relatively inexpensive means for collecting tolls.

Another object is to increase the flexibility and versatility of toll collecting devices.

Another object is to minimize mechanical means in toll collecting equipment.

Another object is to reduce the size of toll collecting equipment.

Another object is to provide greater flexibility in locating and protecting toll collecting equipment.

Another object is to reduce the number of toll calls that go through an operator.

Another object is to prevent the unnecessary deposit of coins in a toll collection device.

Another object is to eliminate the need for coin holding and coin return devices on toll collecting equipment.

These and other objects and advantages of the present device will become apparent after considering the following detailed specification of a preferred form of the device in conjunction with the accompanying drawings, wherein—

FIG. 1 shows a typical circuit for a subject pay station constructed according to the present invention; and FIGS. 2–8 are a series of drawings showing the different operating conditions of the circuit of FIG. 1.

Referring to the drawings more in detail by reference numbers, the number 10 refers generally to a telephone set such as a conventional home or office phone set. It is to be noted however, that the subject invention has general application to many types of phones and other devices and it is not intended to limit it to a particular type phone or even to use with a phone as such. The number 12 identifies a pay station constructed according to the present invention. The only connection between the phone 10 and the pay station 12 is a four wire cable 14 which can be made as long or as short as desired, to enable the pay station to be located in any desired location. By having only the simple four wire cable 14 between the pay station and the phone, installation of the pay station is a relatively simple thing.

The telephone set 10 has a lead 16 which is connected to the operating mechanism in the receiver including the ear and mouth pieces. To effect communication with another phone, the lead 16 must also be connected to a telephone line 18. This is accomplished in a dial phone by dialing the number of another phone. The dialing mechanism is not important to the present invention except to the extent that it enables the caller to contact another phone.

The phone set 10 is also provided with a ring circuit (not shown) which is connected between the leads 16 and 18 and is energized when the phone is called. In addition to the dial and ring circuits another circuit is provided and is used after a call is completed to permit voice communication.

The pay station 12 is connected to the phone 10 by the four wire cable 14 and operates in conjunction with the dial, ring, and communication circuits described above. The pay station operates by first permitting the calling party to dial or otherwise energize the ring circuit of a called phone in the usual manner. Thereafter when the called phone is answered circuits in the subject pay station will operate to temporarily prevent voice communication until after the required toll is deposited. When this is done, normal voice communication is established and the call can be completed.

To accomplish this the subject pay station includes an electric circuit with suitable coin operated switch means and other circuit elements including a coin relay 20, a shunt relay 22, and a pair of oppositely polarized rectifiers 24 and 26. The rectifiers 24 and 26 can be selenium rectifiers, diodes, transistors or other similar devices. The specific form of circuit chosen to illustrate the invention is designed for making local toll calls where the standard charge is ten (10) cents. It is not intended, however, to limit the invention to a particular toll or to a dial type phone, and it is clearly within the scope of the invention to use it with long distance calls and also with calls placed through an operator.

The subject circuit also includes first and second dime operated limit switches 28 and 30, respectively, and first and second nickel operated limit switches 32 and 34 respectively. Each of the coin operated limited switches is mounted adjacent to a coin chute or slot and is actuated by movement of an appropriate coin down the chute. Each limit switch includes a common terminal identified by the same number as the switch (followed by) the subscript *a*, a normally open terminal identified in the same way only by a subscript $b$, and a normally closed terminal identified by the subscript $c$. Electrical connection between the common terminal of each limit switch and the normally open terminal thereof is established only when an appropriate coin is in contact with the limit switch. It should also be noted that the first nickel circuit switch 32 and the first dime circuit switch 28 are actuated before the associated second limit switches 34 and 30 respectively because they are located closer to the respective coin slots. This is important to the proper sequence of operation of the device.

After a caller has picked up his phone and dialed, a circuit to ring the called phone is established in the normal way. However, when the receiver at the called phone is lifted, a polarity cahnge or reversal takes place which is standard on most phones presently in operation. That is to say one polarity is required to ring a called phone and the opposite polarity is required to establish voice communication between the two phones. This polarity reversal is made use of in the present device to energize a relay in the pay station at the calling phone at the time when the receiver at the called phone is lifted. The relay that is energized at this time is the shunt relay 22. Prior to completion of the call the shunt relay could not be energized because of the polarity required during dialing. Before the called phone is answered the ring circuit is also available through the circuit shown in FIG. 2, including lead 36, rectifier 24, lead 38, lead 40, normally closed shunt relay contacts 42 and 44, and lead 46.

Figure 3:
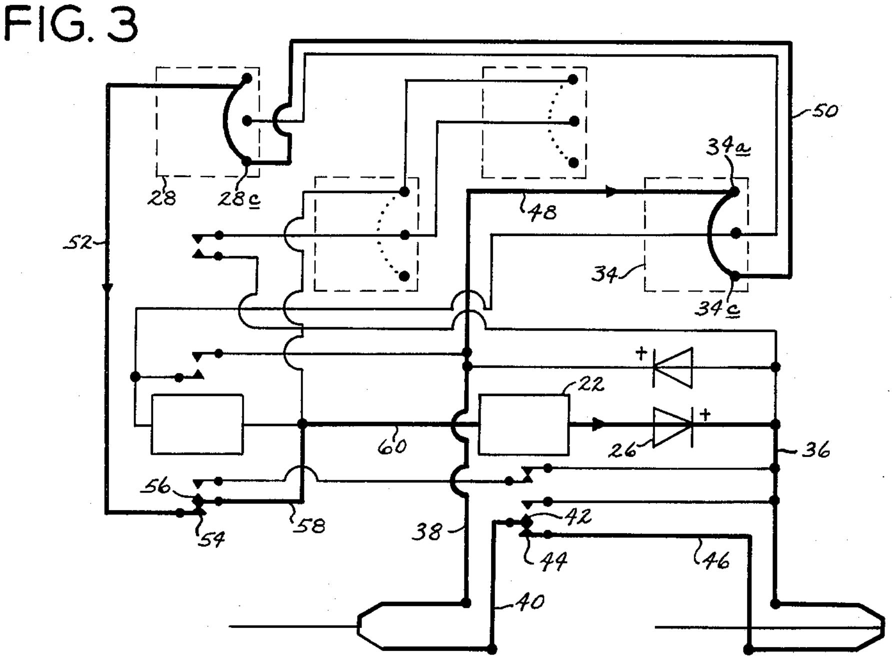

After the called phone has been answered and the polarity reversal has taken place, the above ring circuit is prevented by the same rectifier 24, and another circuit is established through the oppositely polarized rectifier 26 to energize the shunt relay 22. The shunt relay energizing circuit is shown in FIG. 3 with arrows to indicate current flow. The circuit includes the leads 40 and 38, lead 48 to the common terminal 34*a* of the nickel limit switch 34, from there to the normally closed terminal 34*c* of the same nickel limit switch 34, lead 50, to the normally closed terminal 28*c* of the dime limit switch 28, to the common terminal of the same dime limit switch 28, lead 52, the normally closed contacts 54 and 56 of the coin relay 20, which are now closed because no money has been deposited, leads 58 and 60 to and through the shunt relay coil 22, through the rectifier 26 which is now available because of the polarity reversal, the leads 36 and 46, and finally through the normally closed shunt relay contacts 42 and 44. This circuit will energize the shunt relay 22 and transfer the movable terminal 42 into engagement with another terminal 62. Energizing the shunt relay 22 will also open normally closed contacts 64 and 66.

The shunt relay 22 establishes its own hold circuit (FIG. 4) to maintain the relay energized until the required coin deposit is made. The hold circuit for the shunt relay 22 is through the normally open relay contacts 62 and 42 which are now closed, through leads 40, 38 and 48, the normally closed limit switch contacts 34*a* and 34*c*, the lead 50, the normally closed limit switch contacts 28*c* and 28*a*, the lead 52, the normally closed coin relay contacts 54 and 56, the leads 58 and 60, the coil of the shunt relay 22, the rectifier 26, the lead 36, and finally through the lead 68 back to the relay contact 62.

Figure 5:
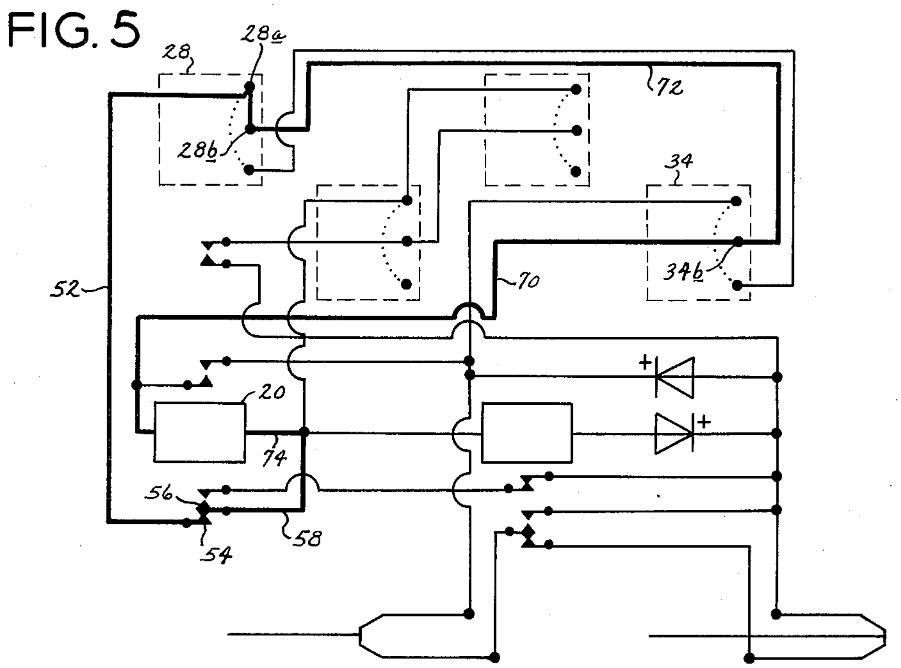

With the shunt relay 22 energized the circuit to the called phone remains completed but operation of the calling phone is shunted and cannot be used until the shunt is removed. To complete the call it is therefore necessary to remove the shunt by deenergizing the shunt relay 22 and this is accomplished by dropping the appropriate coin or coins into the coin slots. As a first example a dime deposit will be made to actuate the dime limit switches 28 and 30. The dime is dropped into the pay station money slot, and conventional mecahnism is provided to direct the dime into position operating the first dime limit switch 28 which for illustration purposes can be a microswitch. After operating the first dime limit switch 28 the dime will move along and operate the second dime limit switch which is also a microswitch. The total time required for the dime to move past both switches is very short. When the limit switch 28 is actuated by the dime the common and normally open terminals 28*a* and 28*b* are electrically connected to establish a circuit to energize the coin relay 20 (FIG. 5).

Figure 4:
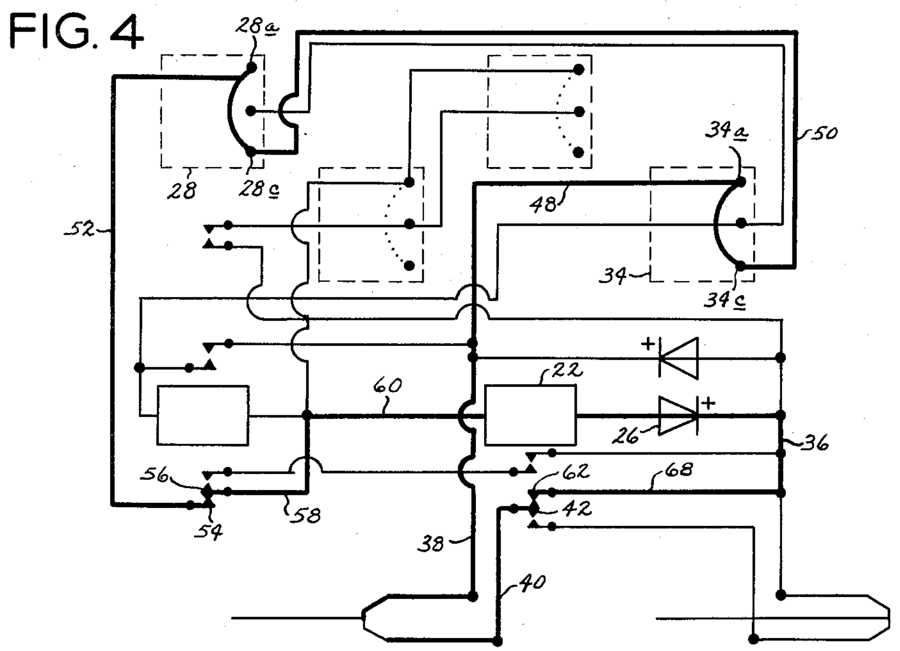

The circuit for energizing the coin relay is parallel to the circuit for energizing the shunt relay 22. This circuit also relies for its operation on the time required for energizing and deenergizing the relays. In other words, when a dime actuates the first dime limit switch 28, the coin relay must be energized before the shunt relay returns to its deenergized condition. The circuit for energizing the coin relay shown in FIG. 5 is parallel to part of the hold circuit for the shunt relay 22 as shown in FIG. 4. This energizing circuit for the coin relay depends for its operation on the actuation of the dime switch 28 by a dime and also on the fact that the shunt relay is energized at the time the dime switch 28 is actuated. When the dime switch is actuated the hold circuit for the shunt relay 22 is momentarily interrupted because of its dependence upon the connection between the common and normally closed contacts of the dime limit switch 28 as already mentioned. However, the shunt relay is adjusted to be slow to move to its deenergized position thereby allowing time to energize the coin relay through a circuit established by the closing of the dime limit switch 28 as shown in FIG. 5. The circuit of FIG. 5 must therefore be considered in conjunction with the circuit of FIG. 4 as already noted.

Figure 6:
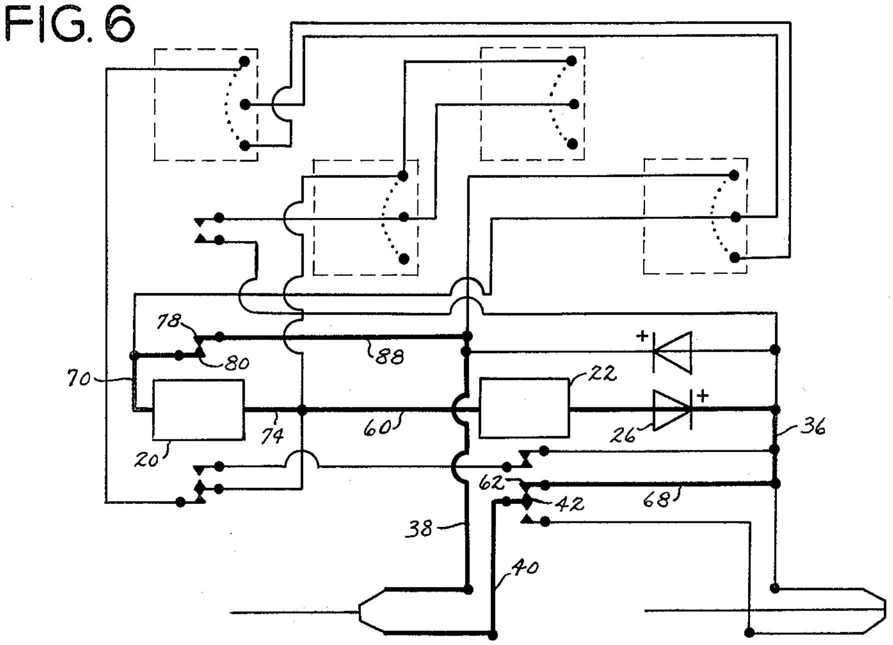

As soon as the coin relay is energized and before the coin reaches the second dime limit switch 30 a circuit is established through the normally open coin relay contacts 78 and 80 to momentarily maintain both the coin and the shunt relays energized. This circuit is shown in FIG. 6.

Figure 7:
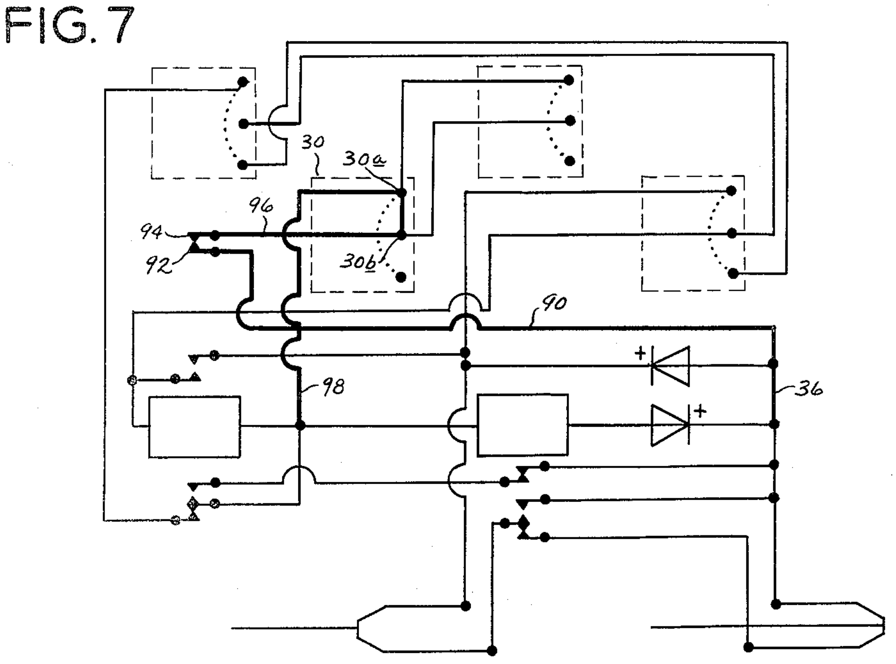

The dime will then move down and actuate the second limit switch 30 to establish the circuit in FIG. 7. This circuit establishes a short circuit across the shunt relay 22 thereby deenergizing the shunt relay but not the coin relay. When the shunt relay is deenergized communication is established between the calling and the called phone. The circuit for deenergizing the shunt relay includes lead 36, lead 90, coin relay contacts 92 and 94, lead 96 to the second dime limit switch terminal 30*b*, the switch terminal 30*a*, and lead 98. The whole operation described above takes place in a very short time interval and there is therefore practically no delay between the time the called party answers his phone and the time the call is completed.

After the dime has moved past the second or bottom dime limit switch 30 it will fall into a suitable coin box. However, the shunt relay 22 will now remain deenergized and the coin relay 20 will remain energized as long as the circuit for voice communication is needed. When the call is finished however, and the receiver is placed back on its hook, another polarity reversal will take place to deenergize the coin relay 20 and return the circuit to its initial deenergized condition.

The subject circuit will also operate on two nickels instead of a dime. When nickels are used however, they actuate the nickel limit switches 32 and 34 in that order and voice communication is established only after the second nickel has actuated the first nickel limit switch 32. The nickel circuits are similar to the dime circuits in many respects except that the first nickel limit switch acts in a manner analogous to the second dime limit switch and the second nickel limit switch acts about like the first dime limit switch. In both cases however, contact with the called phone is established before the money is deposited thereby making it unnecessary to have any coin holding and coin return mechanism.

Figure 8:
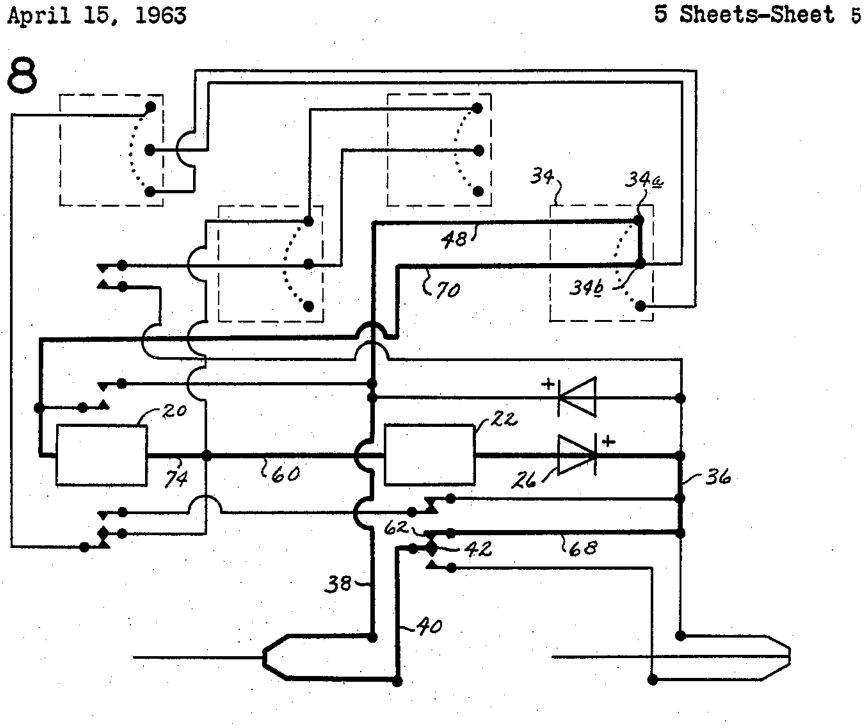

In the case of nickel operation, after contact with another phone is made a polarity reversal takes place as mentioned before in connection with dime operation. The first nickel is now deposited and closes a connection between the first nickel limit switch terminals 32*a* and 32*b*. This operation, however, produces no other change in the circuit and therefore is ineffectual at this point. Thereafter the first nickel moves down the nickel slot and actuates the second nickel limit switch 34 to establish contact between its terminals 34*a* and 34*b*. This action, however, like the first dime circuit switch actuation is effective to establish a circuit for energizing the coin relay 20. The circuit for energizing the coin relay by the first nickel is shown in FIG. 8. The shunt relay 22 however, which was energized when the receiver at the called phone was lifted remains energized to prevent completion of the call until after the second nickel is deposited. The hold circuit for the coin and shunt relays is similar to that described for deposit of a dime (see FIG. 6).

When a second nickel is deposited it actuates first nickel limit switch 32 a second time. This time, however, unlike for the first nickel the coin relay 20 is energized and enables the first nickel limit switch 32 to act like the second dime limit switch 30 above, namely to place a shunt circuit across the shunt relay 22 to deenergize it. This is shown in FIG. 7. However this time the shunt circuit is through the first nickel limit switch terminals 32*a* and 32*b* which are now closed and are connected in parallel to the corresponding terminals on the second dime limit switch 30. The shunt relay is now shorted and deenergized to complete voice communication. With the coin relay energized and the shunt relay deenergized it is not possible to reenergize the shunt relay 22 after the second nickel has moved past the first nickel limit switch 32. It should therefore now be apparent as already noted that a first nickel limit switch 32 operates about like the second dime limit switch 30 and the second nickel limit switch 34 operates similar to the first dime limit switch 28. Again when the call is finished and the receiver is placed back on its hook a polarity reversal takes place to deenergize the relays and restore the circuit to its initial condition.

The subject device can also be used for long distance calling simply by providing a conventional bell device which makes distinctive noises for the different kinds of coins that are easily recognizable by the operator. In this case the caller dials the operator and then makes the requested deposit.

Similar circuits can also be included to make the device operate for different fares. The only limitations on the operation of the present device are those already specified, namely there must be a polarity reversal when the called phone is answered which is already provided on most phones, there must be a coin relay which is energized by switches positioned along the coin slots, there must be a shunt relay which is energized when the call is first completed and deenergized by the deposit of the required toll and there must be suitable coin deposit mechanism equipped with suitable coin limit switches. The subject device is also adaptable for collecting fares or tolls on devices other than phones, and it is not intended to limit the coverage to the particular embodiment or devices disclosed herein.

Thus there has been shown and described a novel pay station for telephones and other devices which fulfills all of the objects and advantages sought therefor. Many changes, variations and modifications of the device, and many other applications therefore will, however, become apparent to those skilled in the art after considering this specification and the accompanying drawings. All such changes, variations, modifications and other uses therefor which do not depart from the spirit and scope of the invention are deemed to be covered by the invention which is limited only by the claims which follow.

What is claimed is:

1. Means for converting a telephone having a receiver and dialing means and connected to telephone control circuits to a coin operated telephone comprising a telephone portion and a coin portion which are structurally and mechanically independent of each other but connected by electric wires only, said coin portion including circuit means enabling the dialing means to be used when the receiver is lifted, means for temporarily preventing voice communication to a dialed phone when the dialed phone is answered and until a proper coin deposit has been made, and means for thereafter establishing voice communication between the calling and dialed phones, said last named means including coin guide means for receiving and guiding coins deposited in the coin portion, switch means positioned along the coin guide means and actuated by predetermined movements of coins in the guide means, said circuit means including relay means under control of the coin switch means for controlling telephone circuits that establish voice communication to a dialed phone in response to predetermined movements of coins in the guide means.

2. The telephone conversion means defined in claim 1 wherein said means temporarily preventing voice communication includes means responsive to a voltage polarity reversal between the calling and the dialed phones in response to the answering of the dialed phone to temporarily prevent voice communication.

3. A telephone pay station comprising a phone portion having a receiver and means when the receiver is lifted for dialing another phone, and a coin portion physically separated from and mechanically independent of the phone portion, said coin portion having a coin receiving slot, guide means for predeterminately guiding coins deposited into the slot, switch means actuated by predetermined movements of coins along the guide means, and circuit means including relay means energized by the switch means in response to said predetermined movements of coins in the coin guide means, said circuit means including means to temporarily interrupt voice communication in response to the answering of a dialed phone and before a proper fare is deposited, and means responsive to predetermined actuation of the switch means by a coin moving in the guide means to establish voice communication.

4. A telephone pay station having distinct and physically separated phone and coin portions, means electrically connecting the said coin and phone portions, said phone portion having a receiver and means when the receiver is lifted for dialing another phone, circuit means including means responsive to a voltage polarity reversal when the dialed phone has been answered but before voice communication is established, said coin portion having a coin slot and associated coin guide means with coin switches located therealong and actuated by predetermined movements of coins in the guide means, other circuit means including first rectifier means for established a first connection between the calling and dialed phone after the number of the dialed phone has been dialed, second rectifier means and associated circuit means for establishing a second circuit connection between the calling and the dialed phone in response to the dialed phone being answered but before a coin is deposited, and means controlled by predetermined actuations of the coin switch means for reestablishing said first connection.

5. The pay station defined in claim 4 wherein said coin guide means includes a separate coin channel and associated coin switches for each different denomination coin to be used.

6. The pay station defined in claim 4 wherein said other circuit means includes first and second relays, said first relay controlling communication to the dialed phone, and said second relay responding to predetermined actuations of the coin switches, each of said relays effecting the operation of the other.

7. A pay station for use with telephones having receiver means and means when the receiver is lifted for dialing other telephones comprising a coin portion physically separated from and mechanically independent of the phone portion and connected electrically to the telephone and including coin receiving and guiding means and a control circuit associated therewith, said control circuit including coin operated switches positioned to respond to coins moving in the guide means and relay means having relay coils energizable by the switches, normally closed contacts associated with the relay means for establishing a dialing circuit to enable the dialing of another phone, means including said relay means for temporarily interrupting voice communication between the calling and dialed phones in response to the dialed phone being answered, said last named means including means responsive to a voltage polarity reversal between the calling and dialed phones, and other means for thereafter reestablishing voice communication with the dialed phone in response to deposit of proper fare in the coin portion.

8. Means for collecting fares for telephone calls from stations having receiver and dialing means comprising a coin unit adapted to be connected to the telephone by electrical connection means, said coin unit being physically separated from and mechanically independent of the phone portion, said coin unit including means activating the telephone dialing means when the receiver is lifted to enable dialing the number of another telephone, circuit means for temporarily prevent voice communication to the dialed phone in respone to the dialed phone being answered and before the required coin fare is deposited, means for receiving a coin fare including coin receiving means and a control circuit associated therewith, said control circuit including switch means associated with the coin receiving means and actuated by predetermined movements of a coin therein, and relay means including relay coil means and relay contact means, said relay contact means initially establishing circuits to actuate the dialing means of the associated telephone when the receiver is lifted to enable the dialing means to be used to dial another telephone, and other circuit means responsive to the answering of the dialed telephone to prevent voice communication therewith until the required fare is deposited, said relay means responding to predetermined movements of coins deposited in the coin receiving means to establish voice communication with the dialed phone.

9. Means for converting a telephone having a receiver portion and a dial portion to a pay station comprising a coin unit having coin receiving means and switch means actuated by predetermined movements of coins therein, and circuit means associated with the coin unit for controlling the operation of the phone in establishing voice communication with another telephone, said coin unit including means for initially establishing a circuit to enable the dialing means to be used to dial another telephone number, means responsive to the answering of the dialed phone to establish a circuit to temporarily prevent voice communication between the calling and the dialed phone until a proper fare has been deposited in the coin receiving means, means responsive to the deposit of a predetermined coin deposit to enable voice communication between the calling and the dialed phone, and means to restore the circuit means to a predetermined condition at the conclusion of a conversion, said coin portion and said telephone being mechanically independent of each other except for an electrical connection therebetween thereby enabling the coin unit to be mounted in any desirable location relative to the telephone.

References Cited by the Examiner

UNITED STATES PATENTS

| | | | |
|---|---|---|---|
| 2,674,655 | 4/1954 | Gallagher | 179—6.5 |
| 2,729,703 | 1/1956 | Faulkner et al. | 179—6.5 |
| 2,820,847 | 1/1958 | King | 179—6.3 |
| 2,881,254 | 4/1959 | Gallagher et al. | 179—6.5 |
| 2,921,980 | 1/1960 | Lomax | 179—6.5 |
| 2,938,953 | 5/1960 | Kaye | 179—6.3 |
| 3,046,341 | 7/1962 | Murphy | 179—6.3 |

ROBERT H. ROSE, *Primary Examiner.*

WALTER L. LYNDE, *Examiner.*

H. BOOHER, H. ZELLER, *Assistant Examiners.*